Jan. 24, 1950 D. G. GRISWOLD 2,495,324
FLUID PRESSURE OPERATED VALVE
Filed Aug. 2, 1943 3 Sheets-Sheet 1

Inventor
Donald G. Griswold
By Baron + Thomas
Attorneys

Inventor
Donald G. Griswold
By Baron + Thomas
Attorneys

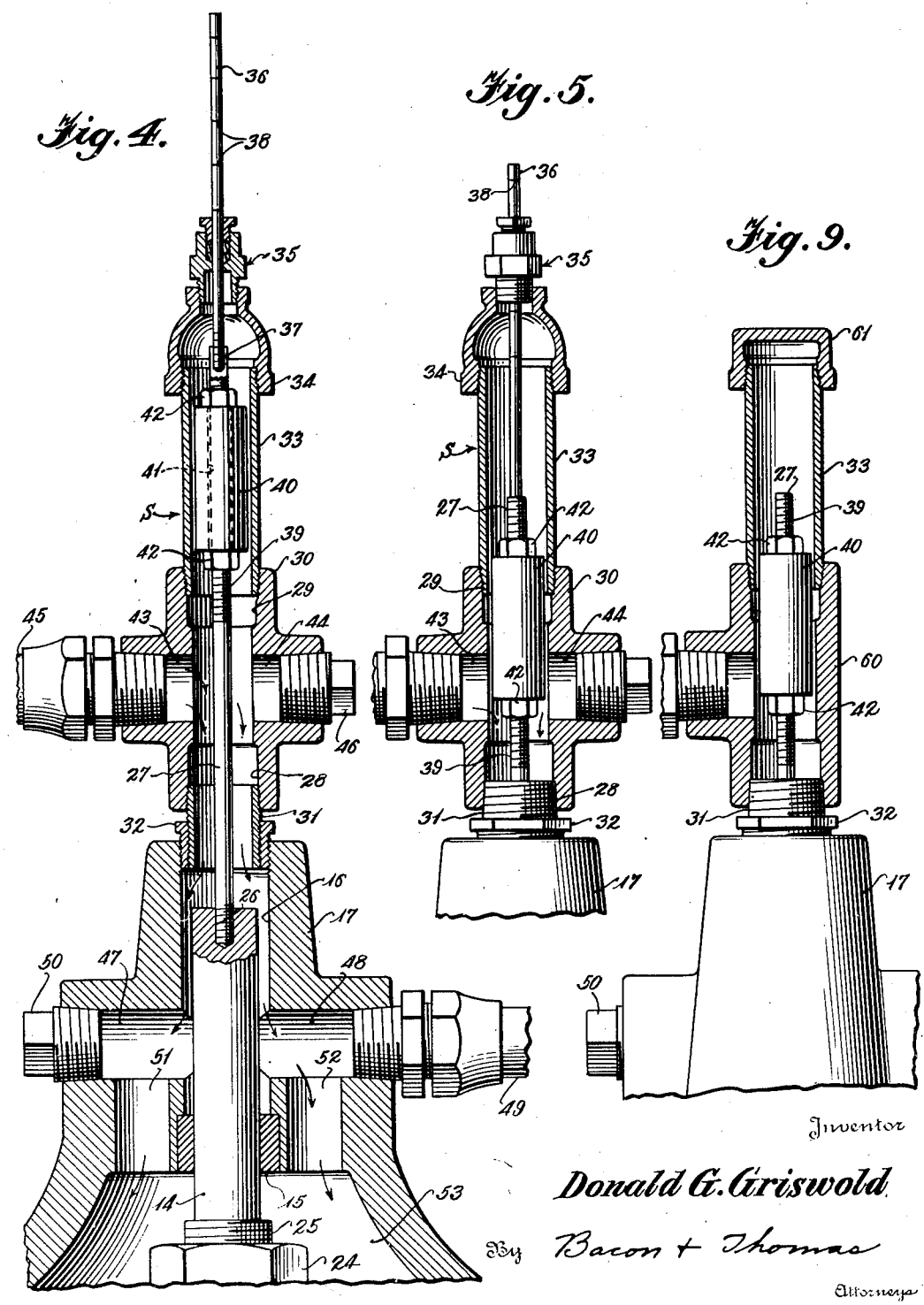

Patented Jan. 24, 1950

2,495,324

UNITED STATES PATENT OFFICE 2,495,324

FLUID PRESSURE OPERATED VALVE

Donald G. Griswold, Alhambra, Calif., assignor to Clayton Manufacturing Company, Alhambra, Calif.

Application August 2, 1943, Serial No. 497,074

22 Claims. (Cl. 137—153)

The present invention relates to an automatic device for governing the speed of operation of fluid pressure operated valves, and to valve means provided with such governing device.

More specifically, the invention relates to a speed control attachment especially adapted to be operatively associated with the cover and stem of a valve of the diaphragm type for controlling the rate of closing and/or opening of the valve.

The principal object of the invention is to provide automatic means for controlling the operation of fluid pressure operated valves.

Another object of the invention is to provide speed control means capable of being adjusted to vary the closing and/or opening rate of a fluid pressure operated valve, whereby the valve can be made to close in accordance with the requirements of the line in which it is to be used and thereby eliminate shock and possible damage to the line or valve which might otherwise occur if the closing rate of the valve was not governed.

Another object of the invention is to provide a control device for regulating the closing operation of a fluid pressure operated valve so that the valve will start to close at a rapid rate and complete its closing movement at a relatively slow rate, and which device will not interfere with the rapid opening of the valve to its full extent or to any partial extent necessary to meet the demands on the line.

Another object of the invention is to provide a control device for regulating the closing speed of a fluid pressure operated valve so that the final closing speed of the valve occurs at a much slower rate than the initial closing speed, and in which the opening speeds of the valve occur in the reverse order to the closing speeds of said valve.

Another object of the invention is to provide control means for regulating the closing and/or opening speeds of a valve which may be adjusted so that the valve will close rapidly during any given portion of its closing movement and then close slowly during the remainder of its closing movement, and in which the opening movement of the valve occurs at a rate different from that at which the valve closed during any given portion of the closing movement of the valve.

A further object of the invention is to provide control means for regulating the closing and/or opening movements of a fluid pressure operated valve arranged so that operating fluid under pressure to effect closing of the valve is admitted into the pressure chamber of the valve at one rate and is exhausted from said chamber at a different rate, whereby the closing and opening movements of said valve occur at different rates.

A still further object of the invention is to provide a closing and/or opening speed control device for use with an automatic check valve of the diaphragm type having a valve stem connected therewith.

Other and further objects of the invention will be apparent from the following description taken in conjunction with the accompanying drawings in which:

Fig. 4 is an enlarged view of the speed control device taken on the line 4—4 of Fig. 1 showing the same in the position that it assumes when the main valve is substantially wide open;

Fig. 5 is a view similar to Fig. 4 but showing the speed control device in a position which it assumes to effect throttling of the flow of fluid to the pressure chamber to cause the latter part of the closing movement of the valve to occur at a reduced rate;

Figure 8:
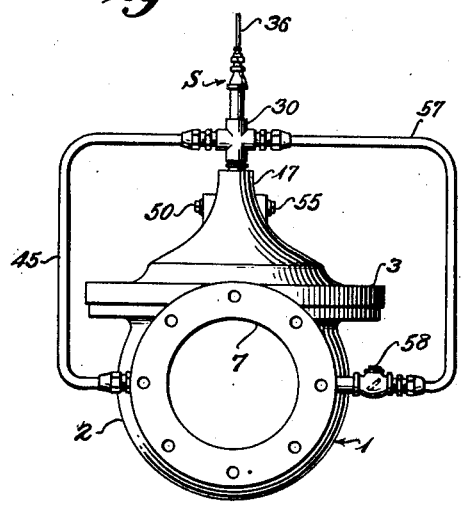

Fig. 8 illustrates a further modified piping arrangement whereby fluid is supplied to the diaphragm chamber at one rate and is exhausted from said chamber at a relatively faster rate, both rates, however, being subject to control by the speed control attachment so that the valve will open at faster rates than it closes; and Fig. 9 illustrates another embodiment of the invention in which the speed control device is of simplified construction.

Figure 1:
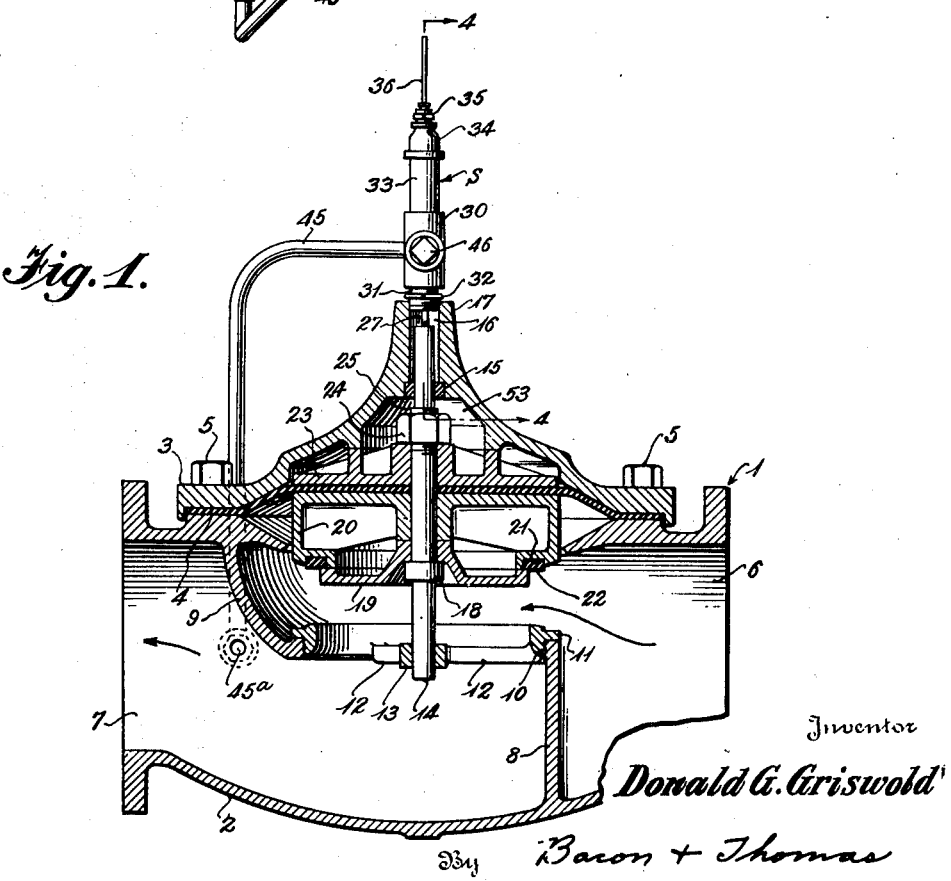
Fig. 1 is a longitudinal sectional view through a diaphragm valve provided with a speed control attachment embodying the principles of the present invention and arranged to govern the closing movement of the valve while permitting substantially unrestricted opening movement of the valve.

Referring now to the drawings, Fig. 1 illustrates an automatic check valve generally indicated by the numeral 1 provided with a speed control device generally indicated by the letter S. While an automatic check valve has been shown for illustrative purposes, it is to be understood that the invention is not limited to use with check valves and that the same is generally applicable to all fluid pressure operated valves including a movable element, whether it be a diaphragm, valve stem, piston, piston rod, etc., to which the flow control member of the speed control device can be operatively connected.

The main valve 1 comprises a body 2, a cover 3, and a flexible diaphragm 4 interposed between said body and cover. The marginal portions of the diaphragm 4 are clamped in sealing engagement with the body 2 and cover 3 by a suitable number of machine screws 5.

The main valve 1 includes an inlet chamber 6 and an outlet chamber 7, separated by a partition comprising a vertical wall portion 8 and an inclined wall portion 9 which are merged to provide an opening 10 which establishes communication between the chambers 6 and 7. The opening 10 is threaded to receive an annular seat member 11. The seat member 11 includes a plurality of radial arms 12 which merge into a central boss 13 serving as a guide for the lower end of a valve stem 14. The upper end of the valve stem 14 is guided by a bushing 15 mounted in an opening 16 formed in a hollow boss 17 projecting upwardly from the cover 3. The valve stem 14 projects through a central opening in the diaphragm 4 and is provided with an enlargement 18 which engages a plate-like member 19 cooperating with a lower diaphragm-supporting member 20 to form a hollow body substantially filling the space in the body 2 above the valve seat 11. The lower diaphragm-supporting member 20 is provided with an annular groove 21 adapted to receive a sealing ring 22 for engaging the seat 11 to prevent flow between the chambers 6 and 7. The edge of the member 19 engages the inner marginal portion of the sealing ring 22 to retain said ring in place. An upper diaphragm-supporting member 23 engages the upper side of the diaphragm 4, and the members 19, 22 and 23 are securely mounted on the valve stem 14 by a nut 24 engaging a threaded portion 25 disposed medially of the length of said stem.

As is best shown in Figs. 4 and 5, the upper end of the valve stem 14 is provided with a threaded opening 26 which receives one end of a rod 27 constituting the movable part of the speed control device S. The rod 27 extends through the vertical openings 28 and 29 of a conventional cross-fitting 30. A suitable pipe nipple 31 and a reducer 32 may be associated with the cross-fitting 30 to enable the same to be mounted upon valve covers having openings 16 of different diameters. As is illustrated, the reducer 32 is threaded into the upper end of the opening 16. The pipe nipple 31 is threaded into the reducer 32 and the opening 28 of the cross-fitting 30 is threaded onto the upper end of the pipe nipple 31. A second pipe nipple 33 is mounted in the upper vertical opening 29 of the cross-fitting 30 and a perforate cap member 34 is mounted upon the upper end of the pipe nipple 33. The cap 34 carries a stuffing box generally indicated by the numeral 35 which provides a seal around an indicator rod 36 threaded into an opening 37 formed in the upper end of the rod 27. It will be understood that the stuffing box 35 may vary in size in accordance with the diameter of the indicator rod 36, which in turn may vary with valves of different sizes. The indicator rod 36 extends upwardly beyond the stuffing box 35 and its exposed portion is provided with graduations 38 to visually indicate the extent of opening of the valve 1 and to indicate the rate of operation of said valve. This will be obvious for the reason that the indicator rod 36 moves up and down to the same extent and at the same speed as the valve stem 14.

The rod 27 may be provided with threads 39 extending throughout its length or through any suitable fraction thereof. Figure 4 shows the rod 27 threaded from its upper end to a point about midway of its length. A cylindrical flow control member 40 is provided with an axial bore 41 through which the rod 27 extends. A pair of clamping nuts 42 are carried on the threaded portion 39, one at each end of the cylindrical member 40, whereby said cylindrical member may be adjusted longitudinally of said threaded portion of the rod 27 and clamped at any desired point therealong.

Figure 2:
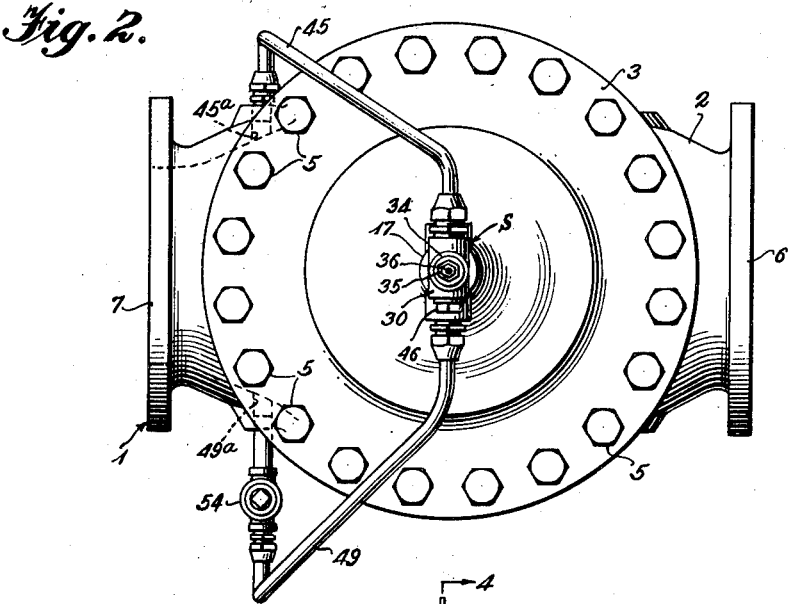
Fig. 2 is a plan view of the valve shown in Fig. 1.
Figure 3:
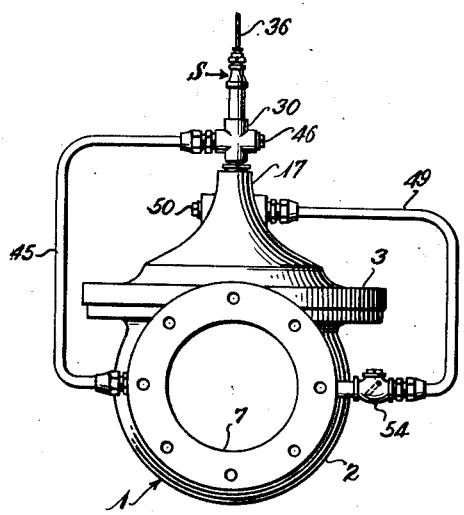
Fig. 3 is an end elevational view of the valve shown in Fig. 1.

The cross-fitting 30 is provided with horizontal ports or lateral openings 43 and 44 with which the flow control member 40 is adapted to cooperate in a manner which will be set forth hereinafter. The port 43 is connected by a conduit 45 with an opening 45ª in the valve body 2 communicating with the outlet chamber 7 of the valve 1 (see Figs. 1 to 3). The port 44 is not used in the particular installation shown and is conveniently closed by a pipe plug 46. Hence, a pipe-tee (not shown) could obviously be used in lieu of the cross-fitting 30, although said cross-fitting is better adapted for universal application.

The boss 17 (Fig. 4) is provided with opposed horizontal openings 47 and 48 which merge with the vertical opening 16. The opening 48 is connected by a conduit 49 with an opening 49ª in the outlet chamber 7 of the valve 1 (see Fig. 2). The outer end of the opening 47 is not used in the installation shown and is conveniently closed by a pipe plug 50. The boss 17 is also provided with vertical passageways 51 and 52 which establish communication between the openings 47 and 48, respectively, and the diaphragm pressure chamber 53 of the valve 1. The conduit 49 includes a one-way check valve 54 arranged so that it will permit the flow of fluid from the diaphragm chamber 53 into the outlet chamber 7 of the valve 1, but will prevent all flow of fluid in the reverse direction. The operation of the speed control device S is as follows:

Assuming that valve 1 is open as illustrated in Fig. 1, upon building up of pressure on the outlet side 7 of said valve, said pressure will be automatically communicated to the diaphragm chamber 53 through the conduit 45, port 43, opening 16, openings 47—48 and passageways 51 and 52. No fluid flows through conduit 49 at this time because the pressure in outlet chamber 7 is greater than that in the diaphragm chamber 53 and the check valve 54 is therefore held closed. As the pressure builds up in chamber 53, the diaphragm 4 will be flexed downwardly and the valve stem 14 will move downwardly therewith. Downward movement of the valve stem 14 results in a corresponding movement of the rod 27 and flow control member 40, but the flow of fluid to the chamber 53 is substantially unrestricted until the lower end of the member 40 assumes a flow obstructing position opposite the port or opening 43 of the cross-fitting 30. As the flow control member 40 moves across the port 43, as illustrated in Fig. 5, it throttles the flow of fluid to the diaphragm pressure chamber 53 so that the volume of fluid entering said pressure chamber is necessarily diminished. Accordingly, downward movement of the valve stem 14 and closing of the valve 1 now proceeds at a slower rate than the initial closing movement. As a result of the controlling action described, the valve 1 starts to close at a fairly rapid rate (and may close at such rate for any part of the closing movement desired) and then completes its closing movement gradually at the reduced rate in accordance with the adjustment of and the flow restriction provided by the flow control member 40. Eventually, of course, the sealing ring 22 will engage the seat 11 and the valve will be completely closed, cutting off all flow between the inlet and outlet openings 6 and 7 without line shock.

Opening of the valve 1 will automatically occur as the pressure on the outlet side 7 of said valve drops below that of the fluid in the diaphragm chamber 53. The spent fluid from the diaphragm chamber 53 can then drain back into the outlet chamber 7 through the conduit 49 at a rapid rate, the check valve 54 opening at this time to permit quick draining of said diaphragm chamber. A portion of said spent fluid can also drain back to the chamber 7 through the conduit 45 during opening of the valve 1, but this is minor. The opening of the valve 1, of course, is necessarily accompanied by upward movement of the valve stem 14, but the rate of opening of said valve is not restricted by the flow control member 40 because the spent operating fluid readily exhausts from the diaphragm chamber 53 through the passageways 51 and 52, opening 48, conduit 49 and check valve 54 so that the valve 1 can open to its full extent, or any extent necessary, without any restriction of its opening movement. Thus, while the speed control attachment S shown in Figs. 1 to 5 permits the valve 1 to close rapidly through any desired portion of its closing movement, and then restricts the final closing movement to a slower rate, said valve can quickly open from its closed position to its wide open position if necessary.

It will be apparent from the foregoing that the cross-fitting 30, pipe plug 46, pipe nipple 33, and cap member 34 provide a housing for the rod 27 and the flow control member 40 comprising readily available, conventional pipe fittings. It will also be apparent that access to the rod 27 for the purpose of adjusting the cylindrical flow control member 40 thereon to vary the timing or rate of closing of the valve 1 can be readily had by removing the pipe nipple 33 from the cross-fitting 30. The clamping nuts 42 are then accessible for adjusting the member 40 to a point anywhere along the threaded portion 39 so that the restricted or retarded closing of the valve can be made to take place through any desired portion of the closing stroke of the valve stem 14. Further modification in the control of the valve 1 can be obtained by substituting a flow control member 40 of different diameter.

Figure 6:
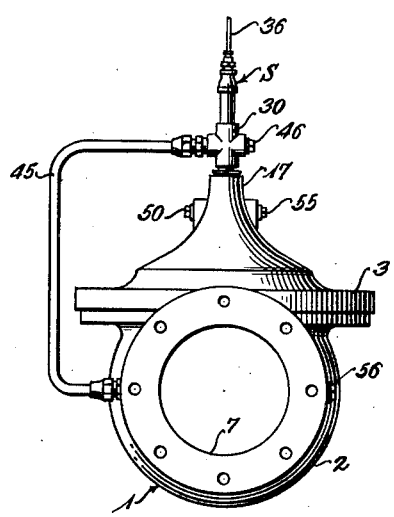
Fig. 6 illustrates a modified arrangement of the piping between the speed control attachment and the main valve whereby opening and closing of said main valve can be effected at substantially the same but relatively reversed rates.

In the modified arrangement shown in Fig. 6, the conduit 49 and the check valve 54 have been omitted. The opening 48 previously communicating with one end of the conduit 49 is closed by a plug 55 and the opening 49ª in the valve body previously connected with the other end of said conduit is closed by a plug 56. Hence, it will be apparent that operating fluid must now be both admitted and exhausted through the conduit 45. Inasmuch as the flow control member 40 traverses the port 43 in the cross-fitting 30 during both closing and opening of the valve 1, it will necessarily obstruct the free escape of fluid from the diaphragm chamber 53 thereby restricting the rate of initial opening movement of said valve and permitting said valve to complete its opening movement at a more rapid rate as the flow control member 40 clears said port. Hence, in this arrangement the valve 1 will start to close at a rapid rate and finally close at a reduced rate, and will start to open at a reduced rate and complete its opening at a more rapid rate. This arrangement is particularly useful in installations where rapid initial opening of the valve is not desired.

Figure 7:
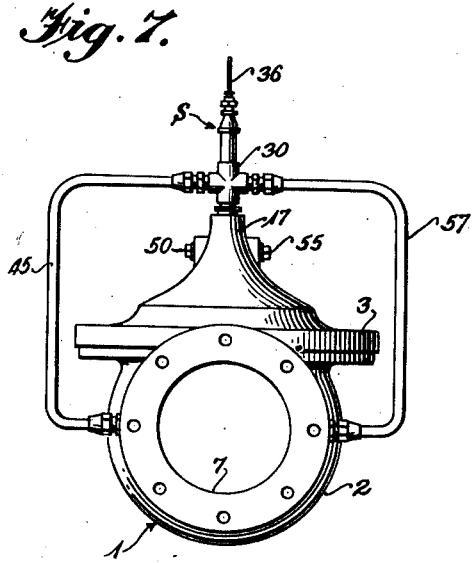
Fig. 7 shows a further modification of the piping connections whereby the speed of the opening and closing movements of the valve shown in Fig. 6 are doubled, but the relationsship of closing and opening at reversed rates is not altered.

Fig. 7 shows a modified arrangement in which the plugs 46 and 56 have been removed and a conduit 57 has been connected with the openings previously closed by said plugs. This construction doubles the rate at which operating fluid can enter and leave the diaphragm chamber. It will be evident that the conduit 57 in this installation acts as a duplicate of the conduit 45 shown in Fig. 6 and speeds up the operation of the valve 1 without affecting the relative timing of the opening and closing movements of the valve.

Fig. 8 shows another arrangement in which a one-way check valve 58 has been connected in the conduit 57, thereby altering the operation of the valve shown in Fig. 7 to the extent that all pressure fluid for effecting closing of the valve 1 must pass through the conduit 45, but in which draining of the fluid from the diaphragm chamber can take place through both conduits 45 and 57. The advantage of this arrangement is that while the initial opening movement of the valve 1 is controlled by the speed control device S, nevertheless said initial opening movement can take place at a relatively faster rate than the rate of final closing movement of said valve.

Fig. 9 shows the speed control attachment itself modified to the extent that a conventional pipe-T 60 has been employed in lieu of the cross-fitting 30 shown in Figs. 1 to 8. Also, the indicator rod 36 has been omitted and the end of the pipe nipple 33 is closed by an ordinary pipe cap 61. The housing and speed control attachment shown in Fig. 9 is particularly well adapted for standardized valves in which only one tubing connection is to be made between the speed control housing and the valve body (as in Figs. 1 to 3), and wherein the indicator rod 36 is omitted.

It will be understood that various changes may be made in the construction of the valve and speed control device disclosed herein without departing from the spirit of the invention or the the scope of the annexed claims.

I claim:

1. A speed control attachment for use with pressure fluid operated valves, comprising: a pipe fitting having upper and lower vertical openings and at least one horizontal opening; a pipe nipple mounted in the upper of said vertical openings; a closure member mounted upon the upper end of said pipe nipple; and means extending through said lower vertical opening reciprocable in said pipe fitting and pipe nipple including a rod and a flow regulating member carried by said rod, said flow regulating member being movable toward said lower vertical opening into flow obstructing position relative to at least one of said horizontal openings as said rod is moved outwardly through said lower vertical opening.

2. A speed control attachment for use with pressure fluid operated valves, comprising: a pipe fitting having upper and lower vertical openings and a lateral opening; a pipe nipple having its lower end mounted in the upper of said vertical openings; a closure member mounted upon the upper end of said pipe nipple; a reciprocable rod extending through said lower vertical opening and disposed longitudinally within said fitting and pipe nipple; a flow control member of smaller size than the internal diameter of said pipe nipple carried by said rod and adapted to be moved into flow obstructing position relative to said lateral opening as said rod is moved outwardly through said lower vertical opening; and means for securing said control member in a predetermined position of adjustment along said rod.

3. A speed control attachment for use with pressure fluid operated valves, comprising: a pipe fitting having upper and lower vertical openings and a lateral opening; a pipe nipple having its lower end mounted in the upper of said vertical openings; a cap member mounted upon the upper end of said pipe nipple; a reciprocable threaded rod extending through said lower vertical opening and disposed longitudinally within said fitting and pipe nipple; a cylindrical member of slightly smaller diameter than the internal diameter of said pipe nipple mounted upon the threaded portion of said rod and adapted to be moved into flow obstructing position relative to said lateral opening as said rod is moved outwardly through said lower vertical opening; and adjusting nuts on said rod engaging the opposite ends of said cylindrical member for locking the same in a predetermined position along the threaded portion of said rod.

4. A speed control attachment for use with pressure fluid operated valves, comprising: a cross-fitting having upper and lower vertical openings and a pair of horizontal openings; a pipe nipple mounted in the upper of said vertical openings; a closure member mounted on the upper end of said pipe nipple; and means reciprocable in said cross-fitting and pipe nipple including a rod extending through said lower vertical opening and a cylindrical member of greater diameter than said rod carried by said rod, said cylindrical member being adapted to be moved toward said lower vertical opening into flow obstructing position relative to said horizontal openings as said rod is moved downwardly through said lower vertical opening.

5. A speed control attachment for use with pressure fluid operated valves, comprising: a cross-fitting having upper and lower vertical openings and a pair of horizontal openings; a pipe nipple mounted in the upper of said vertical openings; a cap member mounted upon the upper end of said pipe nipple; and means recirocable in said cross-fitting and pipe nipple including a rod and a cylindrical member on said rod, said cylindrical member being adapted to be moved into flow obstructing position relative to said horizontal ports as said rod is moved downwardly.

6. An automatic, speed controlled, pressure-responsive valve comprising: a body having inlet and outlet openings; fluid pressure operated means controlling the flow from said inlet to said outlet opening, said means including a reciprocable element and a pressure chamber for receiving operating fluid for effecting movement of said reciprocable element; and means for controlling the speed of operation of said fluid pressure operated means including a housing arranged exteriorly of said valve and continuously communicating at its lower end with said pressure chamber, said housing having an inlet port in the side thereof for the admission of operating fluid for flow through said housing to said pressure chamber, a conduit connecting said port with one of said openings, and means connected with said reciprocable element including a flow regulating member within said housing movable downwardly from a position above said port into flow obstructing position relative to said port for restricting the volume of fluid flowing into said housing and hence through said housing to said pressure chamber during movement of said reciprocable element through a given portion of its down stroke, whereby said fluid pressure operated means will start to close at a rapid rate and final closing will occur at a relatively slow rate.

7. A valve comprising: a valve body having inlet and outlet openings; fluid pressure operated means controlling the flow from said inlet to said outlet opening, said means including a movable element and a pressure chamber for receiving operating fluid for effecting movement of said element; and means for controlling the speed of operation of said pressure operated means including a housing communicating with said pressure chamber, said housing having a port for the passage of operating fluid to said pressure chamber, a conduit connecting said port with one of said openings, a second conduit connecting said pressure chamber with said one opening, a check valve in said second conduit arranged to permit flow only in a direction from said pressure chamber toward said one opening, and means connected with said movable element including a flow regulating member movable into flow obstructing position relative to said port for restricting the volume of fluid flowing to said pressure chamber as said pressure operated means moves downwardly, whereby said pressure operated means will start to close at a rapid rate and final closing movement will occur at a relatively slow rate, and said pressure operated means will start to open at a rapid rate.

8. An automatic check valve comprising: a body having inlet and outlet chambers; a cover member; a diaphragm between said body and cover member and carrying a valve member arranged to control the flow from said inlet to said outlet chamber, said diaphragm cooperating with said cover member to provide a pressure chamber for operating fluid above said diaphragm; a valve stem connected to said diaphragm for movement therewith; and means for controlling the speed of operation of said valve member including a housing having its lower end connected to said cover and communicating with said diaphragm pressure chamber, said housing having a pair of lateral ports intermediate its ends for supplying operating fluid to said diaphragm pressure chamber, a conduit connecting each of said ports with said outlet chamber, and means connected with the uppeer end of said valve stem including a flow regulating member movable into flow obstructing position relative to both of said lateral ports for restricting the volume of fluid entering and leaving said diaphragm pressure chamber through said ports as said valve stem moves downwardly and upwardly, respectively, whereby said valve member will start to close at a rapid rate and final closing movement will occur at a relatively slow rate, and opening movement of said valve member will occur in a reversed order of said closing rates.

9. A valve comprising: a body having inlet and outlet chambers; a cover member having a central hollow boss; a diaphragm between said body and cover member and carrying a valve member arranged to control the flow of fluid from said inlet to said outlet chamber, said diaphragm cooperating with said cover member to provide a pressure chamber for operating fluid above said diaphragm; a valve stem connected to said diaphragm for movement therewith, said valve stem extending into said pressure chamber in alignment with said hollow boss; and means for controlling the speed of operation of said valve member including a housing mounted upon said boss communicating with the interior of said boss, said housing having a port, a conduit connecting said port with the outlet chamber of said body; a second conduit connecting said outlet chamber with said diaphragm pressure chamber; a one-way check valve connected in said second conduit arranged to permit flow only in a direction from said diaphragm pressure chamber toward said outlet chamber; a rod connected with the upper end of said valve stem; a cylindrical member mounted upon said rod adapted to be moved into flow obstructing relation relative to said port as said valve stem moves downwardly for restricting the volume of fluid flowing into said pressure chamber through said port as said valve stem moves downwardly; and means carried by said rod for securing said cylindrical member at any desired point of adjustment along said rod, whereby operating fluid for effecting closing movement of said valve member is conducted from said outlet chamber through said first-mentioned conduit and its flow to said diaphragm pressure chamber is restricted in accordance with the position of adjustment of said cylindrical member to effect initial rapid closing movement and relatively slow final closing movement of said valve member, and spent operating fluid from said diaphragm pressure chamber is principally returned to said outlet chamber at a rapid rate through said second-mentioned conduit so that opening movement of said valve member is effected at a rapid rate.

10. An automatic, fluid pressure operated check valve comprising: a body having inlet and outlet chambers; a cover member having a central hollow boss; a diaphragm between said body and cover member carrying a valve member arranged to control the flow of fluid from said inlet to said outlet chamber, said diaphragm cooperating with said cover member to provide a pressure chamber for operating fluid above said diaphragm; a valve stem connected to said diaphragm for movement therewith, said valve stem extending into said pressure chamber in alignment with said hollow boss; and means for controlling the speed of operation of said valve member including a housing mounted upon said boss communicating with the interior of said boss, said housing having a pair of aligned lateral openings through which operating fluid flows to and from said pressure chamber, a conduit connecting one of said openings with said outlet chamber, a second conduit connecting the other of said openings with said outlet chamber, a rod connected with the upper end of said valve stem, and a flow regulating member adjustably mounted upon said rod adapted to be moved downwardly from a position above said lateral openings into flow obstructing position relative to said lateral openings as said valve stem moves downwardly for restricting the volume of fluid entering said housing through said lateral openings as said valve stem moves downwardly, whereby operating fluid for effecting closing of said valve member is conducted from said outlet chamber through said first and second conduits and its flow to said diaphragm pressure chamber is restricted in accordance with the position of adjustment of said flow regulating member, to effect initial rapid closing and relatively slow final closing of said valve member, and spent operating fluid from said diaphragm pressure chamber is returned to said outlet chamber through said first and second conduits at a rate enabling said valve member to open in a reverse order of speeds.

11. A valve comprising: a body having inlet and outlet chambers; a cover member having a central hollow boss; a diaphragm between said body and cover member and carrying a valve member arranged to control the flow of fluid from said inlet to said outlet chamber, said diaphragm cooperating with said cover member to provide a pressure chamber for operating fluid above said diaphragm; a valve stem connected to said diaphragm for movement therewith, said valve stem extending into said pressure chamber in alignment with said hollow boss; and means for controlling the speed of operation of said valve member including a housing mounted upon said boss communicating with the interior of said boss, said housing having a pair of aligned openings, a conduit connecting one of said openings with said outlet chamber, a second conduit connecting the other of said openings with said outlet chamber, a one-way check valve connected in said second conduit arranged to permit flow only in a direction toward said outlet chamber, a rod connected with the upper end of said valve stem, a flow regulating member mounted upon said rod adapted to be moved into flow obstructing relation relative to said openings as said valve stem moves downwardly for restricting the volume of fluid entering said housing through the opening associated with said first conduit as said valve stem moves downwardly, and means carried by said rod for securing said flow regulating member at any desired point along said rod, whereby operating fluid for effecting closing of said valve member is conducted from said outlet chamber through said first conduit and its flow to said diaphragm pressure chamber is restricted in accordance with the position of adjustment of said flow regulating member, to effect initial rapid closing and relatively slow final closing of said valve member, and spent operating fluid from said diaphragm pressure chamber is returned to said outlet chamber through said first and second conduits at a rate enabling said valve member to open at a reversed but faster rate than it closed.

12. A valve comprising: a body having inlet and outlet chambers; a cover member having a central hollow boss; a diaphragm between said body and cover member and carrying a valve member arranged to control the flow of fluid from said inlet to said outlet chamber, said diaphragm cooperating with said cover to provide a pressure chamber for operating fluid above said diaphragm; a valve stem connected to said diaphragm for movement therewith, said valve stem extending into said pressure chamber in alignment with said hollow boss; and means for controlling the speed of operation of said valve member including a pipe fitting mounted upon said boss and communicating with the interior of said boss, said pipe fitting having upper and lower vertical openings and at least one lateral opening, a pipe nipple having its lower end mounted in the upper of said vertical openings, a cap member mounted upon the upper end of said pipe nipple, a threaded rod disposed longitudinally within said fitting and pipe nipple, the lower end of said rod being connected with said valve stem, a cylindrical member mounted upon the threaded portion of said rod and adapted to be moved into flow obstructing position relative to said lateral opening as said rod is moved by said valve stem, adjusting nuts on said rod engaging the opposite ends of said cylindrical member for locking the same in a predetermined position along the threaded portion of said rod, a conduit connecting one of said openings with said outlet chamber, a second conduit connecting said outlet chamber with said hollow boss; a one-way check valve connected in said second conduit arranged to permit flow only in a direction toward said outlet chamber, whereby operating fluid for effecting closing movement of said valve member is conducted from said outlet chamber through said first conduit and its flow to said diaphragm pressure chamber is restricted in accordance with the position of adjustment of said cylindrical member and the movement of said valve stem to effect initial quick closing movement and relatively slow final closing of said valve member, and spent operating fluid from said diaphragm pressure chamber is principally returned to said outlet chamber through said second conduit at a rate enabling said valve member to move quickly during its entire opening movement.

13. A valve comprising: a body having inlet and outlet chambers; a cover member having a central hollow boss; a diaphragm between said body and cover member and carrying a valve member arranged to control the flow of fluid from said inlet to said outlet chamber, said diaphragm cooperating with said cover to provide a pressure chamber for operating fluid above said diaphragm; a valve stem connected to said diaphragm for movement therewith, said valve stem extending into said pressure chamber in alignment with said hollow boss and means for controlling the speed of operation of said valve member including a cross-fitting mounted upon said boss and communicating with the interior of said boss, said fitting having upper and lower vertical openings and two lateral openings, a pipe nipple having its lower end mounted in the upper of said vertical openings, a cap member mounted upon the upper end of said pipe nipple, a threaded rod disposed longitudinally within said fitting and pipe nipple, the lower end of said rod being connected with said valve stem, a cylindrical member mounted upon the threaded portion of said rod and adapted to be moved into flow obstructing position relative to said lateral openings as said rod is moved by said valve stem, adjusting nuts on said rod engaging the opposite ends of said cylindrical member for locking the same in a predetermined position along the threaded portion of said rod, a conduit connecting one of said lateral openings with said outlet chamber, a second conduit connecting the other of said lateral openings with said outlet chamber, whereby operating fluid for effecting closing of said valve member is conducted from said outlet chamber through said first and second conduits and its flow to said diaphragm pressure chamber is restricted in accordance with the position of adjustment of said cylindrical member and movement of said valve stem to effect initial rapid closing and relatively slow final closing of said valve member, and spent operating fluid from said diaphragm pressure chamber is returned to said outlet chamber through said first and second conduits at a rate enabling said valve member to initially open at a slow rate and to complete its opening movement at a relatively rapid rate.

14. A valve as defined in claim 13, in which a one-way check valve is connected in the second conduit arranged to permit flow only in a direction toward the outlet chamber, whereby the rate of opening of the valve member will be faster than the rate of closing of said valve member.

15. A speed control attachment for controlling the speed of operation of a fluid pressure operated valve, comprising: an elongated housing open at one end and closed at its opposite end, said housing having a lateral port intermediate its ends through which operating fluid may pass into said housing for discharge through said open end; and a reciprocable member extending into said housing through the open end thereof and including a flow controlling portion movable into flow obstructing position relative to said lateral port upon movement of said member in an outward direction for restricting the volume of fluid that can pass through said lateral port, said flow controlling portion being of such length as to be disposable in said housing between the closed end thereof and said lateral port.

16. A speed control attachment as defined in claim 15, including means for adjusting said flow controlling portion longitudinally of said reciprocable member.

17. A speed control attachment for use with pressure fluid operated valves, comprising: an elongated generally cylindrical housing closed at one end and open at the opposite end and having a lateral port disposed adjacent said open end; a reciprocable threaded rod extending through said open end and disposed longitudinally within said housing; a generally cylindrical member of smaller transverse dimension than the internal dimension of said housing mounted upon the threaded portion of said rod and being movable into flow obstructing position relative to said lateral port as said rod is reciprocated, said generally cylindrical member being of such length as to be disposable between the closed end of said housing and said lateral port; and adjusting nuts on said rod engaging the opposite ends of said generally cylindrical member for retaining the same in a predetermined position along the threaded portion of said rod.

18. An automatic check valve comprising: a valve body having an inlet opening and an outlet opening; fluid pressure operated means controlling the flow between said openings including a movable element and a pressure chamber for receiving operating fluid for effecting movement of said element; and means for controlling the speed of operation of said fluid pressure operated means including a hollow housing connected at its lower end to said valve body and having its interior in continuous communication with said pressure chamber, said housing having a lateral port intermediate its ends for the passage of operating fluid therethrough, a conduit exteriorly of said valve body establishing communication between said lateral port and said outlet opening of said valve body; and means connected with said movable element including a flow regulating member positioned above said lateral port when said fluid pressure operated means is wide open and movable downwardly into flow obstructing position relative to said lateral port for restricting the volume of fluid flowing to said pressure chamber during movement of said movable element through a given portion of its travel, whereby said fluid pressure operated means will start to close at a rapid rate and complete its closing at a relatively slow rate.

19. A valve comprising: a body having inlet and outlet chambers; a cover member having a central hollow boss; a diaphragm between said body and cover member and carrying a valve member arranged to control the flow of fluid from said inlet to said outlet chamber, said diaphragm cooperating with said cover to provide a pressure chamber for operating fluid above said diaphragm; a valve stem connected to said diaphragm for movement therewith, said valve stem extending across said pressure chamber into said hollow boss; means in said hollow boss serving as a guide for said valve stem, said hollow boss having a passage means for by-passing fluid around said guide means into said pressure chamber; and means for controlling the speed of operation of said valve member including means for supplying operating fluid to said hollow boss, and flow regulating means movable downwardly with said valve stem arranged to restrict the volume of fluid flowing to said pressure chamber as said valve stem moves downwardly, whereby said valve member will start to close at a rapid rate and final closing will occur at a relatively slow rate.

20. A valve comprising: a body having inlet and outlet chambers; a cover member having a central hollow boss; a diaphragm between said body and cover member and carrying a valve member arranged to control the flow of fluid from said inlet to said outlet chamber, said diaphragm cooperating with said cover to provide a pressure chamber for operating fluid above said diaphragm; a valve stem connected to said diaphragm for movement therewith, said valve stem extending across said pressure chamber into said hollow boss; means in said hollow boss serving as a guide for said valve stem, said hollow boss having passage means for by-passing fluid around said guide means into said pressure chamber; and an attachment for controlling the speed of operation of said valve member including a housing mounted upon said boss and having its interior in continuous communication with said passage means, said housing having a port for supplying operating fluid under pressure to said diaphragm pressure chamber, and means connected with the upper end of said valve stem extending into said housing and including a flow of regulating element movable downwardly into flow obstructing position to control the volume of fluid flowing to said pressure chamber as said valve stem moves downwardly, whereby said valve member will start to close at a rapid rate and final closing will occur at a relatively slow rate.

21. A valve comprising: a valve body; fluid pressure operating means controlling the flow through said body including a movable element and a pressure chamber for receiving operating fluid for effecting movement of said element; and means for controlling the speed of operation of said fluid pressure operated means including an elongated housing closed at its upper end and connected to said valve body and having its lower end continuously communicating with said pressure chamber, said housing having a lateral port intermediate its ends for the passage of operating fluid to and from said pressure chamber, and means connected with said movable element including a flow regulating member positioned above said lateral port when said fluid pressure operated means is in a wide open position and being movable downwardly into flow obstructing position relative to said lateral port for restricting the volume of fluid flowing to and from said pressure chamber during movement of said movable element through a given portion of its travel, whereby said fluid pressure operated means will start to close at one rate and complete its closing at a different rate and start to open at one rate and complete its opening at a different rate.

22. A valve comprising: a body having inlet and outlet chambers; a cover member having a central hollow boss; a diaphragm between said body and cover member and carrying a valve member arranged to control the flow of fluid from said inlet to said outlet chamber, said diaphragm cooperating with said cover member to provide a pressure chamber for operating fluid for said diaphragm; a valve stem connected to said diaphragm for movement therewith, said valve stem extending into said pressure chamber in alignment with said hollow boss; and an attachment for controlling the speed of operation of said valve member including a housing closed at its upper end and having its lower end connected to said boss and communicating with the interior of said boss, said housing having a lateral port intermediate its ends for supplying operating fluid to said diaphragm pressure chamber, and means connected with the upper end of said valve stem extending into said housing and including a flow regulating element movable downwardly from a position above said lateral into flow obstructing position relative to said lateral port for restricting the volume of fluid flowing through said port to said pressure chamber as said valve stem moves downwardly, whereby said valve member will start to close at a rapid rate and final closing will occur at a relatively slow rate.

DONALD G. GRISWOLD.

REFERENCES CITED

The following references are of record in the file of this patent:

UNITED STATES PATENTS

| Number | Name | Date |
|---|---|---|
| 517,199 | Stannard | Mar. 27, 1894 |
| 1,029,600 | Foster | June 18, 1912 |
| 1,560,771 | Feichter | Nov. 10, 1925 |
| 1,805,106 | Robinson | May 12, 1931 |
| 2,000,297 | Putnam | May 7, 1935 |
| 2,220,229 | Grove | Nov. 4, 1940 |
| 2,312,880 | Coffee | Mar. 2, 1943 |
| 2,338,760 | Deming | Jan. 11, 1944 |
| 2,341,394 | Sloan | Feb. 8, 1944 |